R. McFARLANE.
SCALE.
APPLICATION FILED APR. 29, 1910.

1,072,018.

Patented Sept. 2, 1913.

WITNESSES

INVENTOR
ROBERT McFARLANE
BY
ATTORNEY

COLUMBIA PLANOGRAPH CO., WASHINGTON, D. C.

UNITED STATES PATENT OFFICE.

ROBERT McFARLANE, OF MINNEAPOLIS, MINNESOTA, ASSIGNOR, BY DIRECT AND MESNE ASSIGNMENTS, TO McFARLANE MANUFACTURING COMPANY, OF CHICAGO, ILLINOIS, A CORPORATION OF ILLINOIS.

SCALE.

1,072,018. Specification of Letters Patent. Patented Sept. 2, 1913.

Application filed April 29, 1910. Serial No. 558,483.

*To all whom it may concern:*

Be it known that I, ROBERT MCFARLANE, of Minneapolis, Hennepin county, Minnesota, have invented certain new and useful Improvements in Scales, of which the following is a specification.

My invention relates to weighing scales and particularly to that type used for weighing merchandise in a freight warehouse or freight cars on track. Usually beam scales are employed for this purpose and considerable time is required to balance the beam and as the workmen are always in a hurry, the freight and sometimes the cars are moved off the scale before a true balance is obtained, resulting in over or under weight in the freight bills.

The object of my invention is to provide an attachment for a beam scale by means of which the person making a memorandum of the weight can determine at a glance the weight of the article on the scale platform.

A further object of my invention is to provide an attachment for a scale which will allow the use of the main scale beam at any time for weighing purposes and will permit the result obtained by the weighing attachment to be checked or verified by the balancing of the main beam.

A further object is to provide a weighing attachment which can be easily applied to an ordinary platform scale without alteration in the scale itself.

My invention consists generally in interposing a supplementary weighing device between the scale beam and its load.

Further the invention consists in various constructions and combinations, all as hereinafter described and particularly pointed out in the claims.

Figure 1:
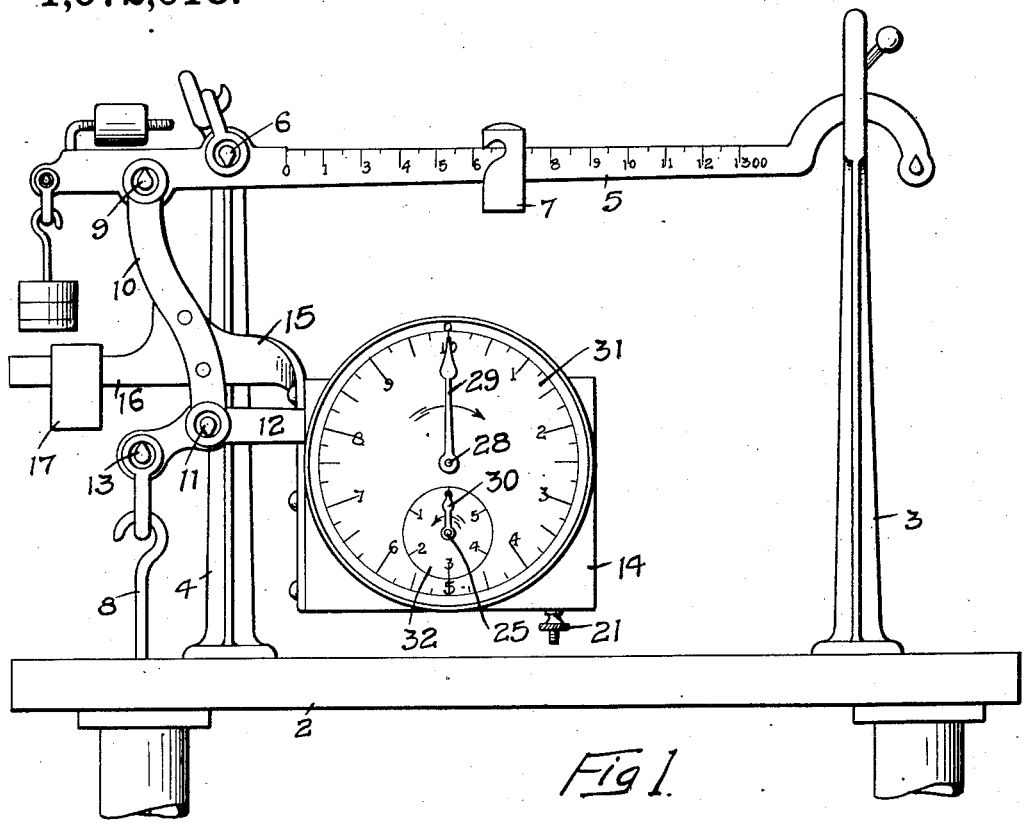
Figure 2:
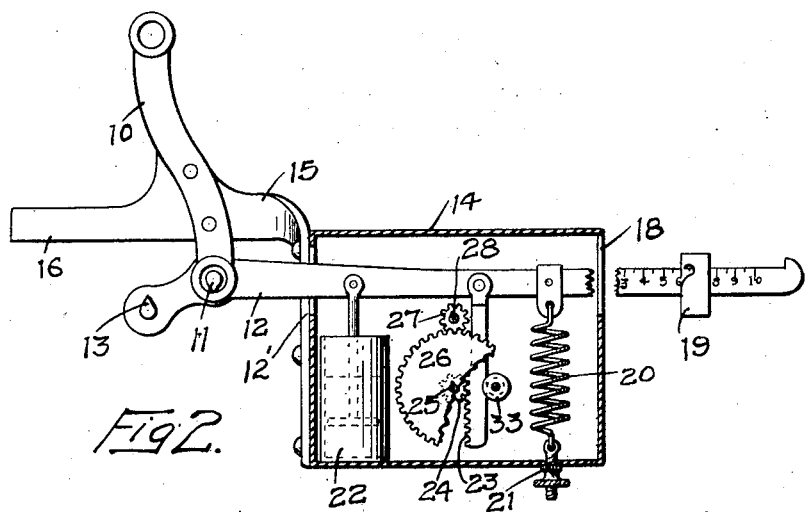

In the accompanying drawings forming part of this specification, Figure 1 is a front elevation of a weighing scale with my invention applied thereto, Fig. 2 is a detail sectional view, showing a modified construction adapted particularly for track scales.

In the drawing, 2 represents the upper portion of a scale which may be of the platform or other suitable type. The lower portion of the scale is omitted from the drawing as it forms no part of my present invention.

3 and 4 are standards supported on the part 2, and 5 is a scale-beam, of any preferred construction, pivoted at 6 in the usual way on the standards 4.

7 is the usual sliding poise.

8 is a rod leading to the levers of the scale platform (not shown), and which is usually attached to the scale beam at 9. To balance the beam with the load on the platform it is usually necessary to move the poise back and forth until the beam with the poise thereon balances the load. In weighing merchandise of various kinds, particularly in freight-houses and in cars on track, the continual balancing of the scale beam requires a great deal of time, and frequently the load is removed from the platform before the beam is accurately balanced, thereby resulting in the entry of an erroneous weight of the car or merchandise on the way-bill or other record. The time and labor expended in balancing the scale in the usual way, and the inaccurate results frequently obtained, particularly at a rush time, have resulted in showing the need or necessity of some device by means of which an accurate weight can be obtained, and such weight determined at a glance without any manipulation of the scale beam or its poise. Freight yards and warehouses are usually equipped with platform scales, of some kind, and in devising an attachment to such a scale it is important that it be of a nature that can be readily applied to the standard platform scale without material alterations therein. With these ends in view I provide a hanger 10 pivotally supported at 9 on the scale beam and having bearings 11 for an auxiliary beam or lever 12. This auxiliary beam or lever has a movement independent of the main scale beam. The rod 8 is connected at 13 to the short arm of the beam or lever 12, and I preferably provide a casing 14 or equivalent device, that incloses a portion of the auxiliary beam, and is carried by a bracket 15, rigidly secured to the hanger 10, and provided with an arm 16 supporting a suitable balance weight 17. A spring 20 is attached to the auxiliary beam or lever and has an adjustable connection 21 with the wall of the casing 14, and a dash-pot 22, of ordinary construction, is preferably mounted in said casing and has a plunger pivotally connected with the auxiliary beam to insure regular uniform travel thereof. This spring 20 is put under tension during the weighing operation, the degree of tension being regulated by the adjustable connection above described and, as shown in Fig. 2, the spring 20 has considerable leverage on the load and I am thus able to use a smaller, lighter spring than could be utilized were the load applied directly to the spring, as is usually the case with a spring scale having an indicating attachment. The beam 12 is movable in a slot 12' in the wall of the casing 14. The connection between the main beam of the scale and the platform levers is divided and the auxiliary weighing device is interposed between the sections.

A rack bar 23 is pivotally connected with the beam or lever 12 and engages a pinion 24 on a stud 25 which carries a gear 26 meshing with a pinion 27 on a post 28 which supports an indicator hand 29. The stud 25 carries a hand 30. A dial 31 is provided for the hand 29 and a dial 32 for the hand 30. An anti-friction roller 33 holds the rack bar in engagement with the pinion 24 while permitting it to reciprocate vertically.

From the foregoing it will be evident that the weight of the load on the scale platform can be instantly determined by glancing at the dial, and, if desired, the results may be checked or verified by balancing the main beam of the scale, the accuracy of which will not in any way be affected by the interposition of this supplementary weighing device between the main beam of the scale and the connection with the platform levers or the support for the load to be weighed. It will also be evident from the foregoing that the use of the auxiliary beam or lever 12 adapts the device for weighing heavy loads, for which a platform scale is so frequently used.

In Fig. 2 I have shown a slightly modified construction which consists in providing a graduated extension on the beam or lever 12 projecting through the wall 18 in the casing 14 and having a poise 19 mounted on said extension. This construction is adapted for use on track scales where the dial indicates thousands of pounds and the auxiliary beam or lever hundreds and fractions thereof. For weighing merchandise in a warehouse this adjunct to the auxiliary beam or scale attachment will usually be found unnecessary. Obviously, the connections between the auxiliary beam or lever and the indicator hand can be modified in various ways to secure the desired travel of the indicator hand. In the dial, as shown, the larger circle of graduations is marked to indicate a thousand pounds and a complete revolution of the indicator hand 29 will cause the hand 30 to move to the first graduation on its scale, the small hand moving in the opposite direction from the large one. This arrangement of the indicator hands is common in scale dials and may be modified in various ways to obtain the desired result.

In the operation of the scale, the beam weights are adjusted in the usual way to balance the empty platform or support for the load. When the load is placed on the scale platform, the indicator hands will move over the graduations on the dial and indicate the weight of the merchandise or of the car on the platform, the beam or lever 12 tilting on its pivots against the tension of the spring 20, and when the indicator hands stop their travel the operator at a glance can determine the weight of the load on the platform. If the operator desires, he can move the poise on the scale beam until the beam balances, the proper position of adjustment of the poise being already indicated by the hands of the dial. The accuracy of the scale attachment may thus be checked and the result verified. The beam and the weighing attachment operate independently of one another and except for purposes of verification the main beam of the scale might be dispensed with, as the weighing could be accomplished with the spring scale attachment and the weight instantly determined. As before stated, however, platform scales are already equipped with the scale beam and the attachment is particularly adapted for application to a scale without making any changes in its construction. At the same time, I do not wish to be confined to the use of this improved spring scale device entirely as an attachment for a scale of any type, as it would prove thoroughly efficient when used independently.

While I have used the word "platform" in the foregoing specification and also use it in the claims I do not wish to be limited to the use of this invention in connection with what are technically known as platform-scales. The device may be used in connection with any form of scales and will be found particularly advantageous in connection with any scale where time and labor are required to balance the beam. By the term "platform" in the claims I intend to include any device which will support or carry the load to be weighed.

I do not limit myself to the details of construction herein shown and described as the same may obviously be varied in many particulars without departing from my invention.

I claim as my invention:—

1. A scale comprising a scale-beam having a poise and a platform connection, a stop for the beam under load, an auxiliary beam or lever interposed in the platform connection and movable independently of said scale beam, a spring connection for said auxiliary beam, and weight indicating means operatively connected with said auxiliary beam and constructed to indicate the weight of the article or object on the platform regardless of the position of the poise on the scale beam.

2. A scale comprising a weighing beam, a sliding poise thereon, a stop for the beam under load, a hanger suspended from said beam, an auxiliary beam or lever pivoted on said hanger, a platform connection attached to said auxiliary beam at one side of its pivot, means yieldingly resisting relative movement of said hanger and auxiliary beam, and a weight indicating device operatively connected with said auxiliary beam and adapted to indicate the weight of the article being weighed regardless of the position of the poise on the beam.

3. The combination with a scale beam having a poise, a platform connection, and a stop for said beam under load, of a hanger interposed between said scale beam and said platform connection, an auxiliary beam carried by said hanger, a spring arranged to resist relative movement of said hanger and auxiliary beam, a graduated dial and an indicator hand connected with said auxiliary beam and arranged to move over said dial, whereby the weight of an article or load on said platform is indicated on said dial regardless of the position of the poise on the scale beam and whereby said indication may be verified by balancing said beam with said poise.

4. A scale comprising a weighing beam, a stop for said beam under load, a hanger suspended from said beam, a casing carried by said hanger, a dial mounted on said casing, an indicator hand, an auxiliary beam or lever pivoted on said hanger and having a limited swinging movement in said casing, means yieldingly resisting relative movement of said auxiliary beam and said hanger, means operatively connecting said indicator hand with said auxiliary beam, and a platform connection from said auxiliary beam.

5. A scale comprising a beam, a platform connection therefor, a casing inclosing a portion of said beam, a spring attached at one end to said beam and having an adjustable connection at its other end with said casing, a dial carried by said casing and having graduations representing the weight of the article on the scale platform, an indicator hand arranged to move over the graduations of said dial, and means operatively connecting said indicator hand with said beam.

6. A scale comprising a weighing beam and a poise, a hanger suspended from the short arm of said beam, a lever pivotally connected with said hanger, means attached to said lever for connection with a load support, means yieldingly resisting relative movement of said lever and said hanger and a weight indicator operatively connected with said lever.

7. A scale comprising a main scale beam, a hanger suspended thereon, a casing carried by said hanger, a dial mounted on said casing, an indicator hand, an auxiliary beam pivoted on said hanger and having a limited swinging movement in said casing, means yieldingly resisting the movement of said auxiliary beam, means operatively connecting said auxiliary beam with said indicator hand, and a platform connection attached to said auxiliary beam.

8. A scale comprising a pivoted weighing beam, a stop for said beam under load, a poise for said beam, a beam-rod, the pivot of said beam being between said beam-rod and said stop, and a weighing device including members connected respectively with said rod and beam, one member being pivotally supported by the other member, and a graduated dial and indicator hand connected with said members respectively, said weighing device operating to indicate the weight load independently of said beam.

9. In a scale, the combination, with a poise controlled weighing beam, and a hanger suspended thereon, of a lever pivoted on said hanger, means connecting the short arm of said lever with the load support, a spring interposed between said hanger and the long arm of said lever and resisting relative movement thereof, a dial and indicator hand carried by said hanger and means operatively connecting the indicator hand with the long arm of said lever.

10. In a scale, the combination, with a poise controlled weighing beam and a rod for connecting with the load support, of a weighing mechanism interposed between said rod and said beam, said weighing mechanism including a graduated scale and pointer operating to indicate the weight load on said support independently of said beam while the subsequent balancing of said beam checks or verifies the weight indicated by said mechanism.

11. In a platform scale, a poise controlled weighing beam graduated to indicate the weight of heavy loads, a rod for connection with the platform levers, a lever actuated weight indicating mechanism interposed between said rod and said beam and including a pointer and dial also graduated to indicate the weight of heavy loads, said pointer and dial enabling the operator to determine at a glance the weight of the load on said platform without adjusting the poise, the subsequent balancing of said beam verifying or checking the weight indicated by said pointer and dial.

12. A scale comprising a pivoted weighing beam, a stop for said beam under load, a poise for said beam, a beam-rod, the pivot of said beam being between said beam rod and said stop, and a weighing device connected with said rod and beam and including a graduated scale and pointer operating to indicate the weight load independently of said beam.

13. In a platform scale, the combination, of a poise controlled weighing beam, a stop for the beam under load, a beam-rod, and a spring scale including a relatively movable hanger and lever interposed in said beam-rod.

14. In a platform scale, the combination, of a poise-controlled weighing beam, fixed stops between which the outer end of said weighing beam moves on opposite sides of its balanced or weighing position, a divided beam-rod and a spring scale interposed between the portions of the beam-rod and including a relatively movable hanger and lever.

15. In a platform scale, the combination, of a poise controlled weighing beam, fixed stops between which the outer end of said weighing beam moves on opposite sides of its balanced or weighing position, a divided beam-rod between the beam and the scale levers, and a dial spring scale interposed between the portions of the beam-rod and including a relatively movable hanger and lever.

16. A scale comprising a pivoted weighing beam, a stop for said beam under load, a poise, a beam-rod, an auxiliary weighing mechanism, including members connected respectively with said beam-rod and with said beam, one member being pivotally supported by the other member, and a graduated dial and indicator hand connected with said members respectively.

17. A scale comprising a weighing beam, graduated for weighing heavy loads, a stop for said beam under load, a beam-rod, a poise for said beam on the opposite side of its pivot from said beam-rod, an auxiliary weighing mechanism, including a stationary graduated dial, a pointer movable over said dial and a pivoted member connected with said beam and rod and with said indicator hand, said auxiliary mechanism indicating the load on the scale within the range of said graduated dial, said scale beam being pivoted for subsequent balancing to check or verify the load indicated by said auxiliary weighing mechanism.

18. A scale comprising a weighing beam, a stop for said beam under load, a poise, a beam-rod, an auxiliary weighing mechanism, including a graduated scale and pointer connected with said rod and beam, said scale and pointer being adapted to indicate at a glance the weight of the load on the scale independently of said scale beam, said scale beam being pivoted for subsequent balancing to check or verify the weight indicated by said auxiliary weighing mechanism.

19. A weighing apparatus comprising a scale beam, a poise therefor, a stop for said beam under load, a beam-rod for said beam, a graduated scale, an indicator hand movable over the graduations of said scale, means operatively connecting said hand with said scale beam and said beam-rod, and a counter-poising device for said connecting means.

In witness whereof, I have hereunto set my hand this 23d day of April 1910.

ROBERT McFARLANE.

Witnesses:
RICHARD PAUL,
J. A. BYRNES.

Copies of this patent may be obtained for five cents each, by addressing the "Commissioner of Patents, Washington, D. C."